(12) United States Patent
Stavely et al.

(10) Patent No.: US 7,349,020 B2
(45) Date of Patent: Mar. 25, 2008

(54) SYSTEM AND METHOD FOR DISPLAYING AN IMAGE COMPOSITION TEMPLATE

(75) Inventors: Donald J. Stavely, Windsor, CO (US); Amy E. Battles, Windsor, CO (US); Sarah J. Barrios, Fort Collins, CO (US); Kenneth R. Stockton, Fort Collins, CO (US); Kathy Louise Miner, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 741 days.

(21) Appl. No.: 10/694,108

(22) Filed: Oct. 27, 2003

(65) Prior Publication Data

US 2005/0088542 A1  Apr. 28, 2005

(51) Int. Cl.
*H04N 5/222* (2006.01)
(52) U.S. Cl. .................. 348/333.02; 348/239
(58) Field of Classification Search ........... 348/333.01, 348/333.02, 333.03, 333.12, 333.04, 207.99, 348/239; 382/243, 278, 287, 291, 313
See application file for complete search history.

(56) References Cited

U.S. PATENT DOCUMENTS

| | | | |
|---|---|---|---|
| 5,557,358 A * | 9/1996 | Mukai et al. ............... | 396/296 |
| 5,870,771 A | 2/1999 | Oberg | |
| 6,573,927 B2 | 6/2003 | Parulski et al. | |
| 6,606,117 B1 * | 8/2003 | Windle ....................... | 348/239 |
| 6,806,906 B1 * | 10/2004 | Soga et al. ............ | 348/333.03 |
| 2002/0171746 A1 | 11/2002 | Stephany et al. | |
| 2003/0025808 A1 | 2/2003 | Parulski et al. | |
| 2003/0058277 A1 | 3/2003 | Bowman-Amuah | |

\* cited by examiner

*Primary Examiner*—Lin Ye
*Assistant Examiner*—Nelson D Hernández

(57) ABSTRACT

A system and method for displaying image composition templates with preview images is described. One embodiment comprises analyzing at least one characteristic of a preview image, determining a nature of the preview image based upon the analyzed characteristic, selecting an image composition template corresponding to the determined nature of the preview image and displaying the selected image composition template concurrently with the preview image.

25 Claims, 3 Drawing Sheets

SYSTEM AND METHOD FOR DISPLAYING AN IMAGE COMPOSITION TEMPLATE

BACKGROUND

Composition of a captured image may be difficult for some users of image capture devices. In addition to lighting, focus and exposure issues, the user must also determine the composition of the captured image. That is, are objects of interest positioned in the frame of the captured image in an interesting and visually pleasing manner?

FIG. 1A is a simplified exemplary captured image 102 of a scenic mountain 104 with a deer 106 and tree 108 in the foreground. The image 102 is, to some, not a visually pleasing image because the horizon, as evidenced by the skewed position of mountain 104 and the non-vertical tree 108, is not level. Furthermore, very little sky 110 is visible in image 102. Advanced scenic photographers have suggested a general rule-of-thumb that the horizon should be approximately along the upper one third or the lower one third of an image, depending upon the object of interest of the image.

FIG. 1B is a simplified exemplary captured portrait image 112 of a woman 114 in a background 116. The portrait image 112 is, to some, not a visually pleasing image because the image of the woman 114 is relatively small with respect to the available frame size of the image 112, not centered within the background 116, and displays too much of the background 116.

Many users of digital cameras could use help in composing an image to be captured.

SUMMARY

One embodiment of the present invention comprises analyzing at least one characteristic of a preview image, determining a nature of the preview image based upon the analyzed characteristic, selecting an image composition template corresponding to the determined nature of the preview image and displaying the selected image composition template concurrently with the preview image.

Another embodiment comprises at least one image composition template corresponding to a predefined subject matter, a photosensor configured to sense an image, a display configured to display a preview image corresponding to the sensed image, a processor configured to analyze at least one characteristic of the preview image, determine a nature of the preview image and select the image composition template when the nature of the preview image corresponds to the image composition template.

BRIEF DESCRIPTION OF THE DRAWINGS

The components in the drawings are not necessarily to scale relative to each other. Like reference numerals designate corresponding parts throughout the several views.

DETAILED DESCRIPTION

An object determination and template display system 400 (FIG. 4) is configured to automatically determine the nature of an image that is to be captured, and based upon that determination, select and display an image composition template with preview image to assist the user of the image capture device. Image composition templates may be uniquely associated with natures determined for preview images.

Figure 1A:
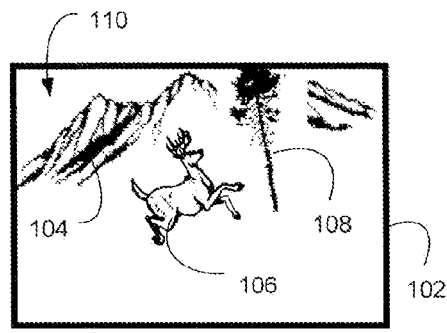
FIG. 1A is a simplified exemplary captured image of a scenic mountain with a deer and tree in the foreground.
Figure 1B:
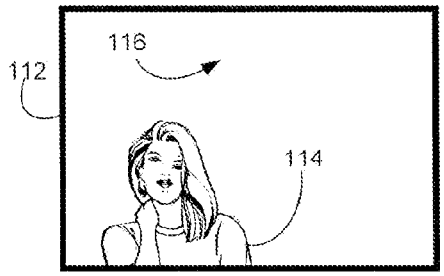
FIG. 1B is a simplified exemplary captured portrait image of a woman in a background.
Figure 2A:
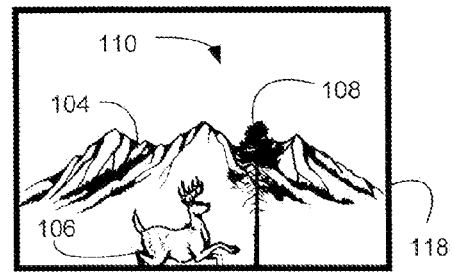
FIG. 2A is a simplified exemplary preview image of a scenic mountain with a deer and tree in the foreground.
Figure 4:
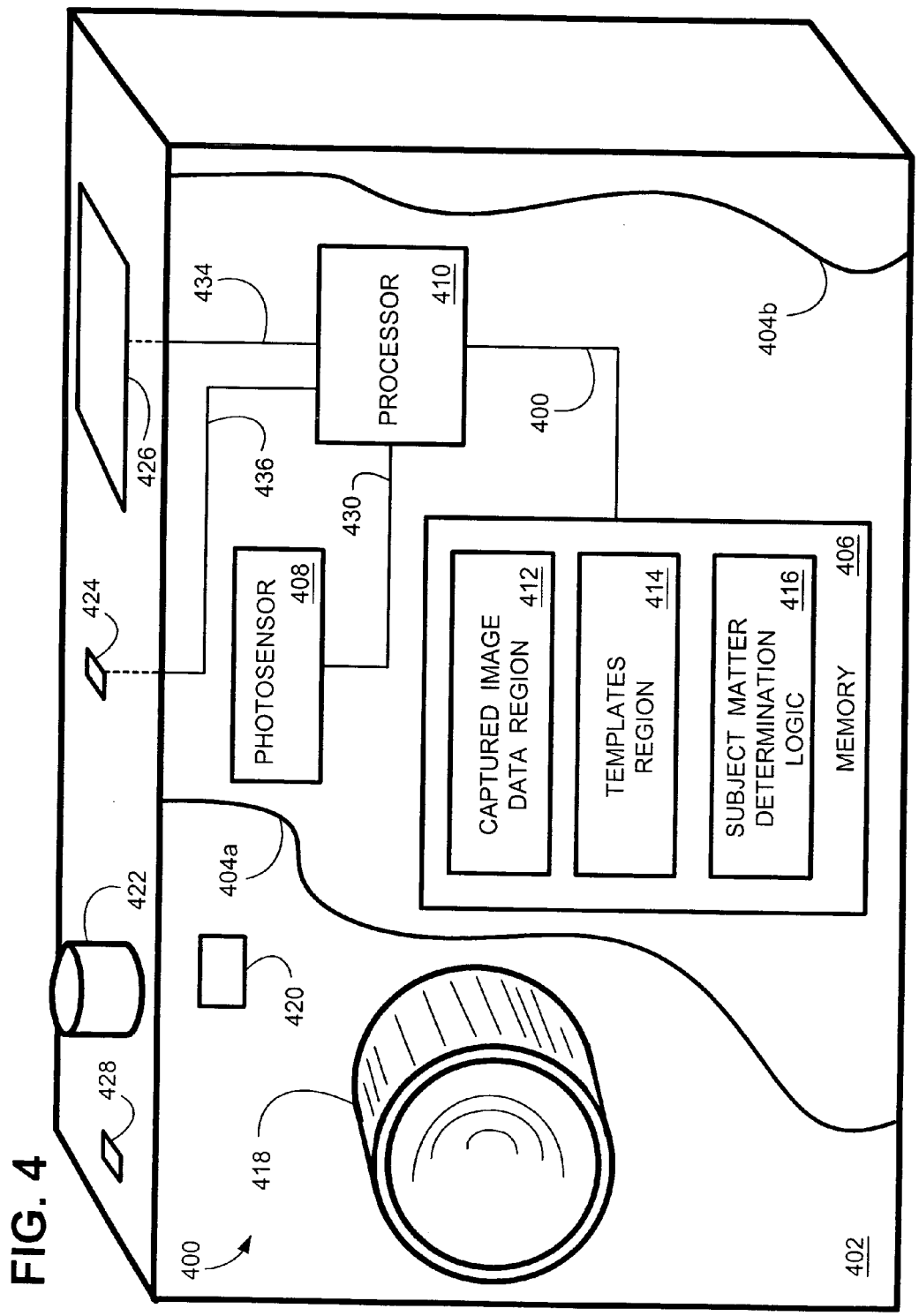
FIG. 4 is a block diagram illustrating an embodiment of an object determination and template display system.

FIG. 2A is a simplified exemplary preview image 118 of a scenic mountain 104 with a deer 106 and tree 108 in the foreground. The preview image 118 corresponds to a current reading from a photosensor 408 of digital camera 402 (FIG. 4). Preview image 118 is displayed on display 426, and/or is viewable directly through viewfinder 420 (FIG. 4). Viewing of the preview image 118 is described in greater detail hereinbelow.

It is apparent from preview image 118 that capturing an image of a scenic mountain 104 with a deer 106 and tree 108 in the foreground may not result in a visibly pleasing image to some viewers since the lower portions of the deer 106 and tree 108 would not be visible in the captured image. In this example, the object determination and template display system 400 initially determines that the general nature of the preview image 118 is a scenic view. Next, an image composition template 120 (FIG. 2B) is selected and displayed on the display 426. (In another embodiment, image composition template 120 is visible through viewfinder 420 (FIG. 4).) The image composition template 120 helps to provide the user to adjust the positioning of objects of interest within the image frame in a more visually pleasing and interesting captured image.

Figure 2B:
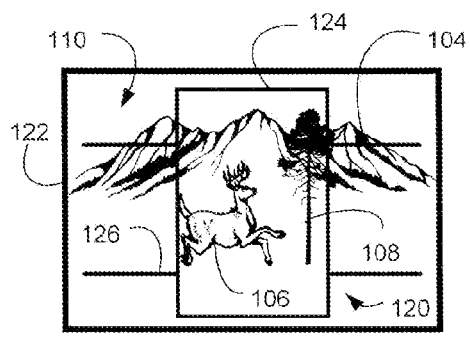
FIG. 2B is a simplified exemplary preview image of a scenic mountain with a deer and tree in the foreground after the user has adjusted position of objects of interest as suggested by an image composition template.

FIG. 2B is a simplified exemplary preview image 122 of the scenic mountain 104 with deer 106 and tree 108 in the foreground after the user has adjusted the position of objects of interest as suggested by an image composition template 120 which is concurrently displayed with the preview image. This exemplary image composition template 120 is designed to assist the user to position objects in a scenic view. This exemplary image composition template 120 includes a box 124 that indicates to the user that objects of interest should be centered within and/or around the box 124. Furthermore, image composition template 120 may include one or more horizon lines 126 to aid the user in orienting the frame in a true horizontal orientation, and in placing the horizon along the upper one third or the lower one third of the captured image.

Accordingly, the user has oriented the scenic mountain 104, deer 106 and tree 108 as illustrated in preview image 122. Once the user is satisfied with the placement of the scenic mountain 104, deer 106 and tree 108, the user causes the digital camera 402 (FIG. 4) to capture the image thus arranged.

When the image is captured in one embodiment, the image composition template 120 is not included in the data of the captured image. That is, only the preview image sensed by photosensor 408 is saved as captured image data into the captured image data region 412.

However, in another embodiment, the data corresponding to the image composition template 120 is saved as a separate file, or associated with, the captured image for later display. Thus, the user of digital camera 402 may optionally select display of an associated image composition template when a captured image is displayed on display 426, displayed on another device, printed, or communicated.

In another embodiment, the image composition template 120 is saved as part of the captured image. Saving image composition templates into the captured image data results in the image composition data and the captured image being displayed together when viewed on a display 426, displayed on another device, printed, or communicated.

The above-described embodiments which save and/or associate image composition templates with captured images may be used by the user at a later time as a learning tool. An image composition template used to assist the user is associated with the captured image or the preview image using a suitable indicia. When the user later views the captured image, the image composition template is determinable because of the association. The associated image composition template may be saved as part of the captured image data or saved as a separate data file associated with the captured image data. Accordingly, the user may view the image composition template along with the captured image at a later time to determine if the user, and/or other viewers, are visually pleased with the captured image.

Figure 3A:
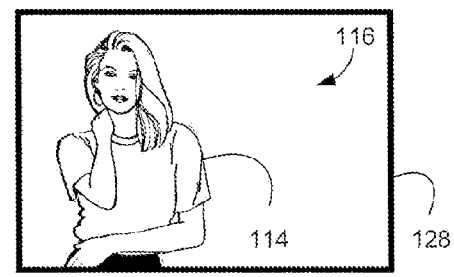
FIG. 3A is a simplified exemplary preview image of a image of a woman in a background.

FIG. 3A is a simplified exemplary preview image 128 of a woman 114 in a background 116. A preview image 128 corresponds to a current reading from the photosensor 408 of digital camera 202. Preview image 128 is displayed on display 426, and/or is viewable directly through viewfinder 420 (FIG. 4).

However the preview image 128 may not be a visibly pleasing image to some viewers since the woman 114 is not centered in the image. As in the previous example, the object determination and template display system 400 determines that the general nature of the preview image 128, in this case a portrait of a person. Next, an image composition template 132 (FIG. 3B) corresponding to this nature is selected and displayed on the display 426. This image composition template 132 assists the user to adjust the positioning of objects of interest within the image frame to create a more visually pleasing and interesting captured image.

Figure 3B:
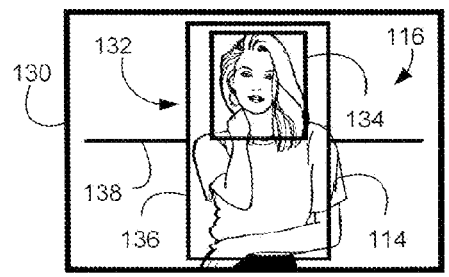
FIG. 3B is a simplified exemplary preview image of the woman centered in the preview image after the user has adjusted position of objects of interest as suggested by an image composition template.

FIG. 3B is a simplified exemplary preview image 130 of the woman 114 centered in the preview image 130 after the user has adjusted position of objects of interest as suggested by an image composition template 132 which is concurrently displayed with the preview image. This exemplary image composition template 132 is designed to assist the user to position a person or the like in a portrait. This exemplary image composition template 132 includes a box 134 that indicates to the user that the face of the woman 114 should be centered within and/or around the box 134. This embodiment of image composition template 132 may also include a second box 136 that indicates to the user that the body of the woman 114 should be centered within and/or around the box 136. Additionally, image composition template 132 may include one or more horizon lines 138 to aid the user in orienting the frame in a true horizontal orientation.

Accordingly, the user has oriented the woman 114 as illustrated in preview image 130. Once the user is satisfied with the placement of the woman 114, the user causes the image digital camera 402 (FIG. 4) to capture this image.

FIG. 4 is a block diagram illustrating an embodiment of an object determination and template display system 400 implemented in a digital camera 402. The system is equally applicable in any electronic device configured to capture images. Exemplary non-limiting alternative embodiments include digital video cameras, film-based cameras, scanners, personal digital assistants (PDAs), telephones and computers employing cameras, or other imaging systems wherein a displayed image composition template aids the user to orient an object of interest within a frame for image capture.

FIG. 4 shows selected external and internal components of the digital camera 402. Internal components are illustrated between the cut-away lines 404a and 404b. The internal components include at least memory 406, photosensor 408 and processor 410. In one embodiment, memory 406 further includes a captured image data region 412 configured to store captured image data, a templates region 412 configured to store a plurality of image composition templates, and a subject matter determination logic 416 configured to store logic configured to automatically determine the nature of an image that is to be captured.

External components of digital camera 402 include lens 418, viewfinder 420, shutter button 422, controller 424, display 426 and power switch 428. For convenience, display 426 is illustrated on the top of digital camera 402. In other embodiments, display 426 is located in another suitable location on the digital camera 420.

Operation of the digital camera 402 is initiated by actuation of the power switch 428 or an equivalent device having the same functionality. Photosensor 408 is disposed in a suitable location behind lens 418 such that an image of the object of interest may be focused onto photosensor 408 for capturing. In one embodiment, display 426 displays a view of an image currently visible through the lens 418 and detected by photosensor 408, referred to herein as a preview image. When digital camera 402 is displaying a preview image, digital camera 402 is referred to herein as operating in a preview mode.

Prior to capturing an image of an object, the operator of the digital camera 402 visually previews the image of the object on display 426. Or, a view corresponding to the image of the object may be viewed directly through the viewfinder 420. Photosensor 408 is disposed in a suitable location behind lens 418 such that an image of the object of interest may be focused onto photosensor 408 for capturing.

Processor 410 retrieves and executes the subject matter determination logic 416. Data corresponding to the preview image is analyzed by processor 410 to determine at least one characteristic of the preview image and/or the object of interest. Based upon detected characteristics of the preview image and/or object of interest detected on photosensor 408, digital camera 402 automatically determines the nature of the preview image that is to be captured.

Subject matter determination logic 416 comprises one or more image recognition algorithms and/or object recognition algorithms configured to determine the nature of the preview image. One embodiment comprises a scene analysis algorithm to identify coarse attributes of the scene. For example, but not limited to, the image can be divided into a coarse grid. The grid can be compared against a number of pre-stored grid patterns to determine the best match. The comparison may be based on the relative brightness, color, or other scene attributes. Each pre-stored grid pattern is associated with an appropriate template for presentation to the user. As another example, the image can be analyzed for the presence of strong horizontal features. Such a feature near the vertical center of the image may indicate a horizon line dividing the image in two. An appropriate template can be presented that suggests moving the horizon line so as to conform to the "rule of thirds" to improve image composition. Other embodiments employ sophisticated object recognition algorithms to identify objects using greater detailed attributes of the scene.

A face recognition algorithm that identifies the presence of facial characteristics may also be used. Subject matter determination logic 416 analyzes objects of the preview image data to determine if a human face is present in the preview image.

Upon the determination that the object of interest is a human, based upon a recognition of one or more human facial characteristics, the object determination and template display system 400 determines that the user desires to capture a portrait image of a person, i.e. the nature of the preview image is a "human portrait." Image composition template 132 has been associated with portrait images and resides in the templates region 414 of memory 406. Accordingly, image composition template 132 (FIG. 3B) which is retrieved from the templates region 414, and is then displayed on the display 426, via connection 434. In another embodiment, image composition template 132 is displayed on viewfinder 420 such that when the viewer views the object through the viewfinder 420, the image composition template 132 is also visible.

Using the image composition template 132 as guidance, the user of digital camera 402 repositions the digital camera 402 such that the person is positioned in a desirable manner. Thus, the image composition template 132 has assisted the user in composing the image to be captured.

When the operator has focused the image of the person and is satisfied with the focused image, the operator actuates the shutter button 422 to cause digital camera 402 to capture the image as presently shown in the preview image. Photosensor 408 has an image of an object of interest focused thereon by lens 418 and creates digital image data corresponding to the image. That data is transferred to the camera processor 410, via connection 430.

In one embodiment, the digital image data corresponding to the image is communicated to the memory 406, via connection 432, and stored in the captured image data region 412. Accordingly, the captured image data region 412 is configured to store many images. In another embodiment, digital image data is transferred to a detachable memory module or a remote memory (not shown).

One embodiment employs a landscape recognition algorithm that identifies the presence of a landscape. Upon the determination that the object of interest is a landscape, based upon a recognition of one or more landscape characteristics, such as the sky, a horizon, trees or other typical objects associated with landscape scenes, the object determination and template display system 400 determines that the user desires to capture a landscape image, i.e. the nature of an image is a "landscape." Image composition template 120 (FIG. 2B) corresponding to this landscape nature of the image is retrieved from the templates region 414, and is then displayed on the display 426. In another embodiment, image composition template 120 is displayed on viewfinder 420 such that when the viewer views the object of interest through the viewfinder 420, the image composition template 120 is also visible. In an embodiment employing an algorithm that identifies coarse attributes of the scene, the identification of the scene as a landscape may be accomplished by the coarse scene analysis described above. The coarse scene analysis using one or more coarse grids may identify predominantly white and blue in the elements of the upper grid(s), and may identify predominantly darker green, brown, or gray elements of the lower grid(s), indicative of sky and landscape, respectively. Accordingly, the image composition template 120 is displayed.

Information from other components may be used in addition to the scene attributes to determine which image composition template best matches the user's intent in composing the picture. For example, embodiments may be implemented in cameras that also include an orientation sensor which indicates camera orientation, such as whether the camera is held horizontally or vertically. Orientation information aids the subject matter determination logic 416 in choosing templates with the proper orientation (portrait or landscape) for the picture. As another example, information corresponding to the focus distance of the preview image can aid the subject matter determination logic 416 in choosing templates. Clearly, a closely focused subject eliminates many templates appropriate only for distant subjects, such as scenic landscapes, and suggests that others, such as portrait templates, are appropriate for close subjects.

Using image composition template 120 as guidance, the user of digital camera 402 repositions the digital camera 402 such that objects of interest, such as the mountain 104, deer 106 and/or tree 108, are positioned in a desirable manner. Thus, the image composition template 120 has assisted the user in composing the image to be captured. When the operator has focused the image of the landscape and is satisfied with the focused image, the operator actuates the shutter button 422 to cause digital camera 402 to capture the image currently shown in the preview image.

Any suitable object recognition system now known or later developed may be incorporated into the subject matter determination logic 416. Such recognition systems may analyze colors, object characteristics or other features detected on photosensor 408 to determine the nature of the preview image. Once the nature of the preview image has been determined, the subject matter determination logic 416 specifies an image composition template that corresponds to that nature. That image composition template is then retrieved from the templates region 414 and displayed concurrently with the preview image.

In one embodiment, a plurality of related image composition templates may be provided for a single determined subject matter type. For example, but not limited to, the subject matter determination logic 416 may in one situation determine that the subject matter is a person, and accordingly, that the user intends to capture an image of at least that person. Then, a plurality of portrait related image composition templates are displayed on the display 426 so that the user may select the image composition template that best meets their particular image capture needs. For example, an image composition template having two of the boxes 132 and/or 136 could be displayed for capturing an image of two people. Similarly, a long elongated box could be displayed to help the user compose an image of a group of people.

Multiple image composition templates, in one embodiment, are scrolled through using the above-described controller 424, or another suitable controller. Template selection in another embodiment is implemented using a menu selection system displayed on display 426. It is understood that the number and nature of image composition templates that can be provided to the user of digital camera 402 are unlimited.

Any suitable indicia displayed on an image composition template may be provided to assist the user in composing images for capture. One indicia may be a single line indicating vertical or horizontal alignment. Another embodiment may be a pair of perpendicular lines indicating vertical and horizontal alignment. Markers or other suitable indicia may be added to provide additional reference to the user. Furthermore, any suitable geometric shape may be used as an indicia to identify regions where an object of interest should be framed into the image. The illustrative examples of FIGS. 2B and 3B employed rectangular shapes for convenience. Other embodiments may employ circles, ellipses, paragons, triangles or other geometry as indicia. It is understood that the indicia displayed on an image composition template are unlimited.

In one embodiment, the object determination and template display system 400 implemented in digital camera 402 is a selectable feature. Controller 424 is configured such that actuation of controller 424 enables or disable the operation of the object determination and template display system 400. Examples of controller 424 include, but are not limited to, a push-button, a toggle-switch, a multi-position sensing device configured to sense a plurality of positions, a touch sensitive device or a light sensitive device. In one embodiment, the functionality of controller 424 may be alternatively implemented as a menu displayed on display 426.

In one embodiment, viewfinder 420 is an optical based device configured to align the view of the user with the image sensed by photosensor 408. The displayed image composition template is then displayed concurrently with a view of the preview image, or a view corresponding to the preview image, using a heads-up display device or other similarly suited display means. In another embodiment, viewfinder 420 includes a relatively small electronic display that resides within the viewfinder 420. The display residing in the viewfinder 420 is configured to display the image sensed by photosensor 408. Another embodiment may employ its own photosensor element that is aligned with photosensor 408.

Figure 5:
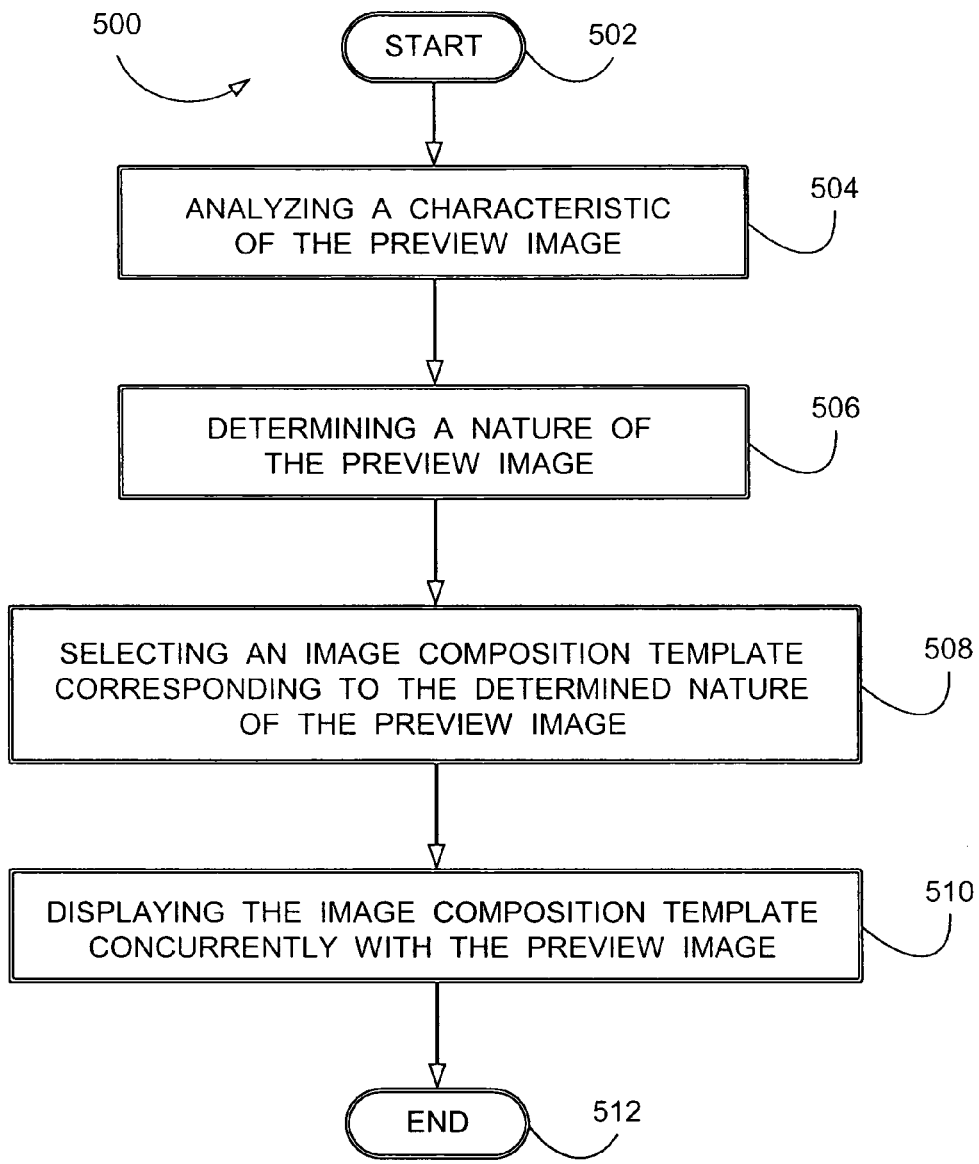
FIG. 5 shows a flow chart 500 illustrating a process for an embodiment of image capture device.

FIG. 5 shows a flow chart 500 illustrating one embodiment of a process for aiding a user of an image capture device 402 (FIG. 4). The flow chart 500 shows the architecture, functionality, and operation of an embodiment for implementing the subject matter determination logic 416 (FIG. 4) such that the nature of an image that is to be captured is automatically determined, and based upon that determination, an image composition template that will assist the user of the image capture device is selected and displayed. An alternative embodiment implements the logic of flow chart 500 with hardware configured as a state machine. In this regard, each block may represent a module, segment or portion of code, which comprises one or more executable instructions for implementing the specified logical function(s). It should also be noted that in some alternative implementations, the functions noted in the blocks may occur out of the order noted in FIG. 5, or may include additional functions. For example, two blocks shown in succession in FIG. 5 may in fact be substantially executed concurrently, the blocks may sometimes be executed in the reverse order, or some of the blocks may not be executed in all instances, depending upon the functionality involved, as will be further clarified hereinbelow.

The process begins at block 502. At block 504, at least one characteristic of a preview image is analyzed. At block 506, a nature of the preview image based upon the analyzed characteristic is determined. The nature of the preview image is determined by analyzing the received data corresponding to the preview image. At block 508, an image composition template corresponding to the determined nature of the preview image is selected. At block 510, the selected image composition template is displayed concurrently with the preview image. The process ends at block 512.

Embodiments of the above-described system or methodology that are implemented in memory 406 (FIG. 4) may be implemented using any suitable computer-readable medium. In the context of this specification, a "computer-readable medium" can be any means that can store the data associated with, used by or in connection with the instruction execution system, apparatus, and/or device. The computer-readable medium can be, for example, but not limited to, a semiconductor system, apparatus, or device now known or later developed.

It should be emphasized that the above-described embodiments are merely examples of implementations. Many variations and modifications may be made to the above-described embodiments. All such modifications and variations are intended to be included herein within the scope of this disclosure and protected by the following claims except insofar as limited by express claim language or the prior art.

The invention claimed is:

1. A system, comprising:
a plurality of image composition templates, each of the image composition templates associated with at least one of a plurality of preview image natures, at least one image composition template corresponding to a predefined subject matter;
a photosensor configured to sense an image;
a display configured to display a preview image corresponding to the sensed image; and
a processor configured to perform an analysis of at least one characteristic of the preview image;
wherein the processor is configured to determine a nature of the preview image based on an analysis of the at least one characteristic of the preview image through employment of a scene analysis algorithm to identify coarse attributes of the preview image;
wherein the processor is configured to employ the scene analysis algorithm to select the image composition template based upon the nature of the preview image in which the processor divides the preview image into a coarse grid and compares the coarse grid against a number of pre-stored grid patterns to determine a best match with one of the pre-stored grid patterns associated with a corresponding one of the image composition templates.

2. The system of claim 1, wherein the processor is configured to employ the scene analysis algorithm to compare the coarse grid against a number of pre-stored grid patterns to determine a best match based on the relative brightness, color, or other scene attributes.

3. The system of claim 1, wherein each of the image composition templates is uniquely associated with the nature of the preview image.

4. The system of claim 1, wherein the processor is configured to employ the scene analysis algorithm to analyze for presence of strong horizontal features with consideration that a horizontal feature near a vertical center of the image may indicate a horizon line dividing the image in two and a template can be presented that suggests moving the horizon line so as to place the horizon along an upper one third or a lower one third of the image.

5. The system of claim 3, further comprising a menu displayed on the display, the menu configured to select one of the plurality of image composition templates associated with the nature of the preview image.

6. The system of claim 1, further comprising a memory configured to store logic configured to analyze the nature of the preview image, wherein the logic comprises the scene analysis algorithm.

7. The system of claim 1, further comprising a memory configured to store the image composition template.

8. The system of claim 1, further comprising a viewfinder, the viewfinder configured to display a view of the preview image concurrently with the image composition template.

9. The system of claim 1, wherein the preview image is concurrently displayed with the image composition template on the display.

10. A method comprising the steps of:
analyzing at least one characteristic of a preview image by a digital camera, wherein each image composition template of a plurality of image composition templates is associated with at least one of a plurality of preview image natures;
automatically determining a nature of the preview image by the digital camera based upon the analyzed characteristic through employment of a scene analysis algorithm to identify coarse attributes of the preview image;
automatically selecting an image composition template by the digital camera corresponding to the determined nature of the preview image through employment of the scene analysis algorithm to divide the preview image into a coarse grid and compare the coarse grid against a number of pre-stored grid patterns for determination of a best match with one of the pre-stored grid patterns associated with a corresponding one of the image composition templates; and
displaying the selected image composition template concurrently with the preview image.

11. The method of claim 10, further comprising the step of receiving data corresponding to the preview image from a photosensor.

12. The method of claim 10, wherein the step of displaying comprises displaying the selected image composition template concurrently with the preview image on a display.

13. The method of claim 10, wherein the step of displaying comprises displaying the selected image composition template concurrently with a view corresponding to the preview image on a viewfinder.

14. The method of claim 10, further comprising the steps of:
capturing an image corresponding to the preview image with an image capture device; and
saving captured image data corresponding to the captured image.

15. The method of claim 14, further comprising the step of saving the selected image composition template as part of the captured image data.

16. The method of claim 14, further comprising the steps of:
associating the selected image composition template with the captured image data; and
saving the selected image composition template.

17. The method of claim 10, further comprising the step of saving image data corresponding to the preview image.

18. The method of claim 10, wherein the step of automatically selecting the image composition template comprises:
employing the scene analysis algorithm to cause one or more coarse grids to identify:
predominantly white and blue in elements of one or more upper grids indicative of sky; and
predominantly darker green, brown, or gray elements of one or more lower grids indicative of landscape.

19. The method of claim 10, further comprising the step of associating a plurality of image composition templates uniquely with a plurality of preview images.

20. The method of claim 10, further comprising the step of retrieving the selected image composition template from a memory.

21. A system for displaying image composition templates with preview images, comprising:
means for displaying a preview image on a display;
means for analyzing at least one characteristic of the preview image, wherein each image composition template of a plurality of image composition templates is associated with at least one of a plurality of preview image natures;
means for automatically determining a nature of the preview image based upon the analyzed characteristic through employment of a scene analysis algorithm to identify coarse attributes of the preview image;
means for selecting an image composition template corresponding to the determined nature of the preview image through employment of the scene analysis algorithm to divide the preview image into a coarse grid and compare the coarse grid against a number of pre-stored grid patterns for determination of a best match with one of the prestored grid patterns associated with a corresponding one of the image composition templates; and
means for displaying the selected image composition template concurrently with the preview image.

22. The system of claim 21, further comprising means for displaying the selected image composition template concurrently with the preview image on the display.

23. The system of claim 21, wherein the means for selecting the image composition template comprises:
means for employing the scene analysis algorithm to cause one or more coarse grids to identify:
predominantly white and blue in elements of one or more upper grids indicative of sky; and
predominantly darker green, brown, or gray elements of one or more lower grids indicative of landscape;
the system further comprising means for displaying the selected image composition template concurrently with a view corresponding to the preview image on a viewfinder.

24. The system of claim 21, further comprising:
means for capturing an image corresponding to the preview image with an image capture device; and
means for saving captured image data corresponding to the captured image.

25. A computer readable tangible medium having a program for displaying image composition templates with preview images, the program comprising logic that when executed by an image capturing device would perform the steps of:
receiving data corresponding to a preview image from a photosensor;
analyzing at least one characteristic of a preview image by the image capturing device, wherein each image composition template of a plurality of image composition templates is associated with at least one of a plurality of preview image natures;
determining a nature of the preview image by the image capturing device based upon the analyzed characteristic through employment of a scene analysis algorithm to identify coarse attributes of the preview image;

selecting an image composition template by the image capturing device corresponding to the determined nature of the preview image through employment of the scene analysis algorithm to divide the preview image into a coarse grid and compare the coarse grid against a number of pre-stored grid patterns for determination of a best match with one of the pre-stored grid patterns associated with a corresponding one of the image composition templates; and displaying the selected image composition template concurrently with the preview image.

\* \* \* \* \*

UNITED STATES PATENT AND TRADEMARK OFFICE
CERTIFICATE OF CORRECTION

PATENT NO. : 7,349,020 B2  
APPLICATION NO. : 10/694108  
DATED : March 25, 2008  
INVENTOR(S) : Donald J. Stavely et al.

Page 1 of 1

It is certified that error appears in the above-identified patent and that said Letters Patent is hereby corrected as shown below:

In column 10, line 28, in Claim 21, delete "prestored" and insert -- pre-stored --, therefor.

Signed and Sealed this

Fifth Day of May, 2009

JOHN DOLL  
*Acting Director of the United States Patent and Trademark Office*